May 26, 1970 TED L. C. KUO 3,514,527
INSULATION PIERCING CONNECTOR
Filed Dec. 4, 1967 7 Sheets-Sheet 4

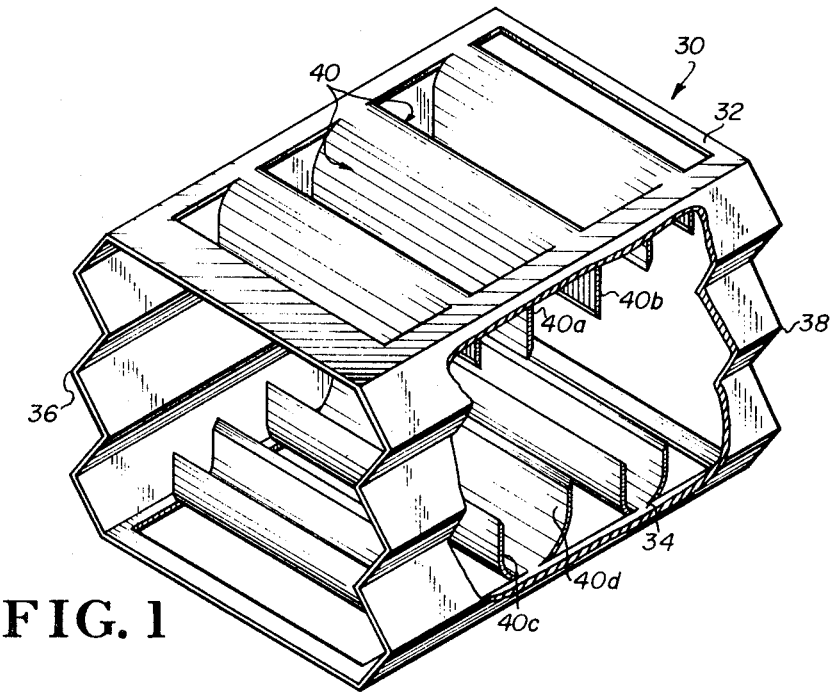
FIG. 1
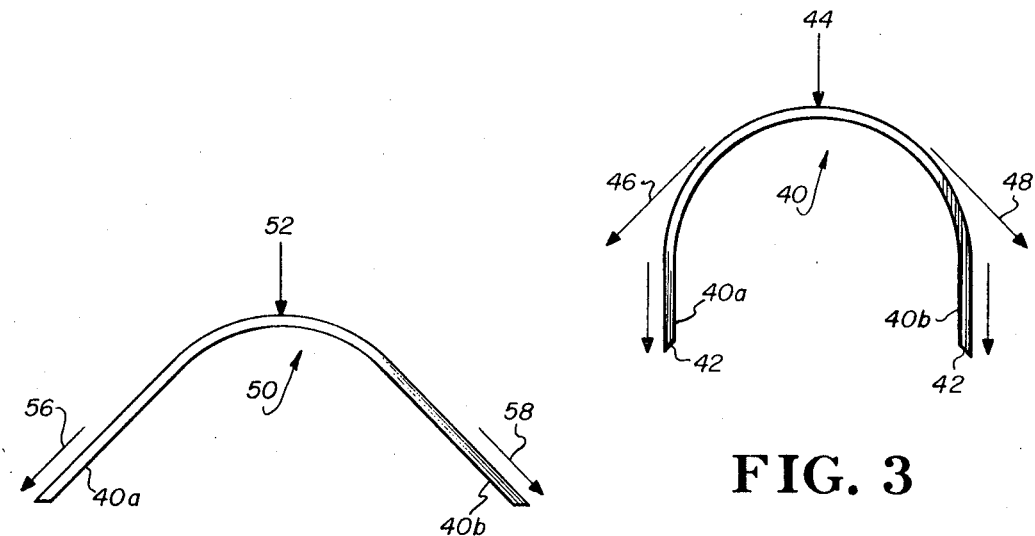
FIG. 3
FIG. 4

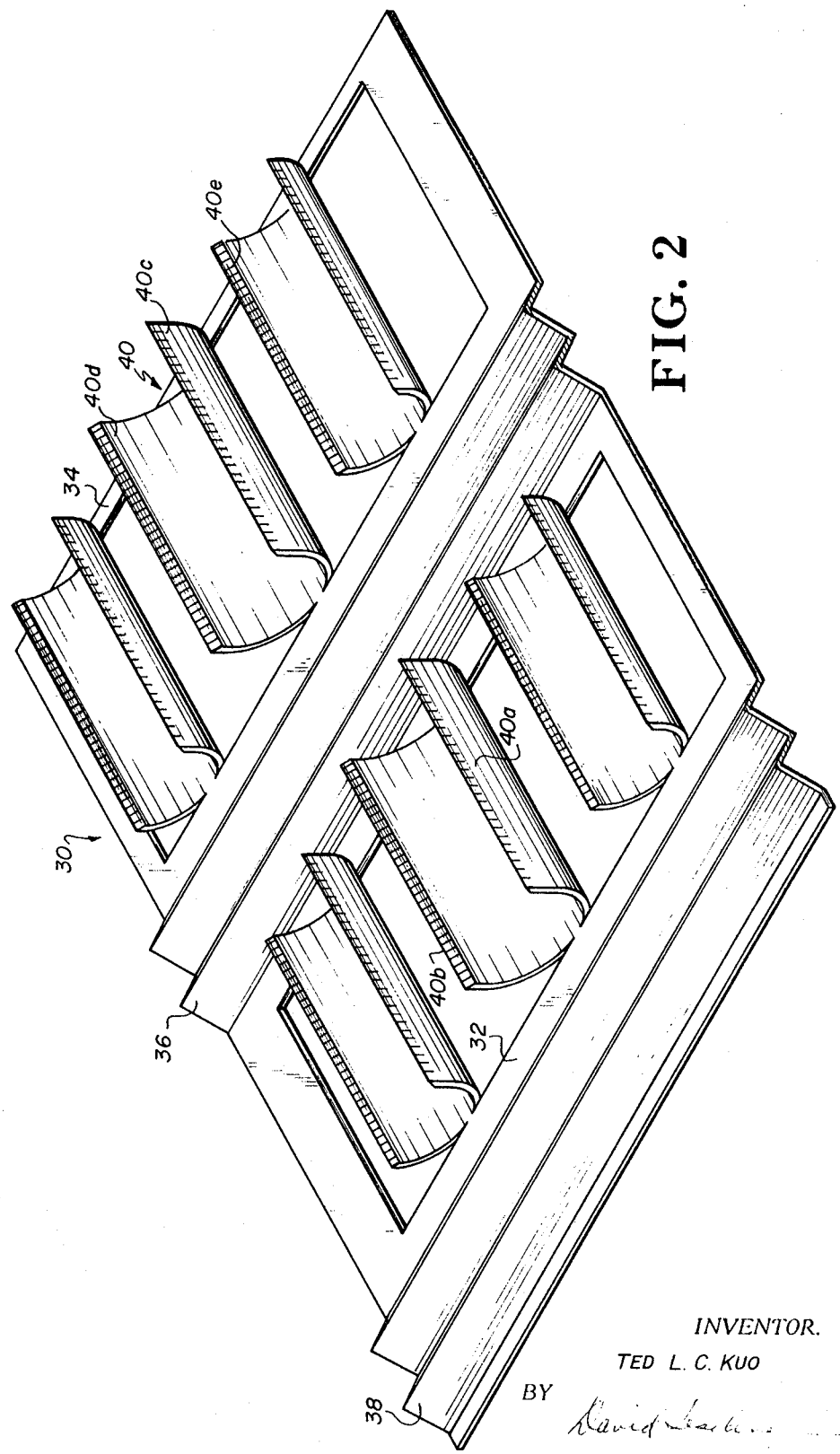

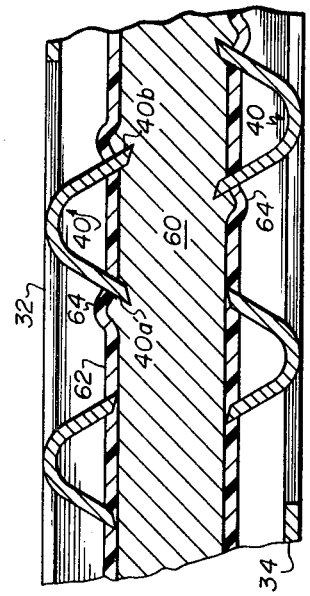
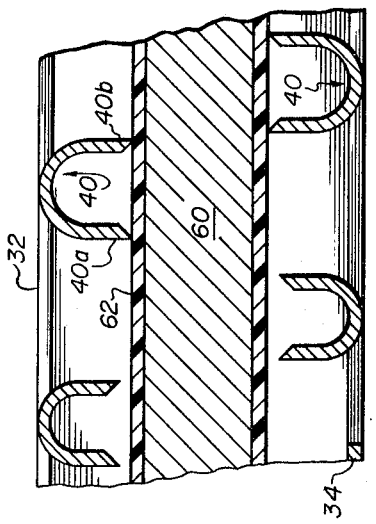
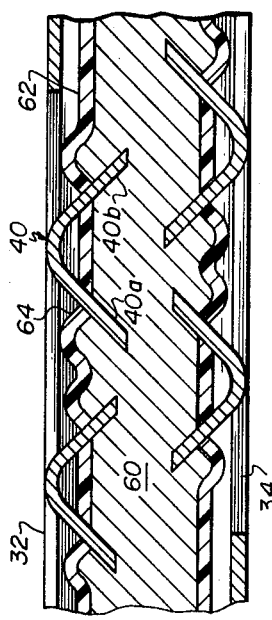
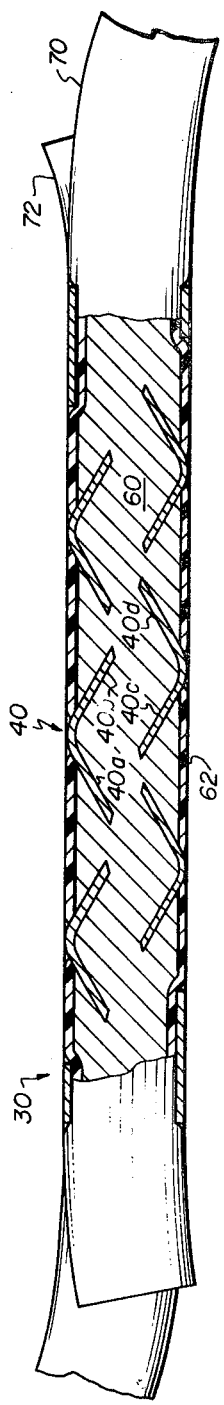

INVENTOR.
TED L. C. KUO
BY
ATTORNEY

INVENTOR.
TED L. C. KUO

BY

ATTORNEY

May 26, 1970        TED L. C. KUO        3,514,527
INSULATION PIERCING CONNECTOR
Filed Dec. 4, 1967        7 Sheets-Sheet 7
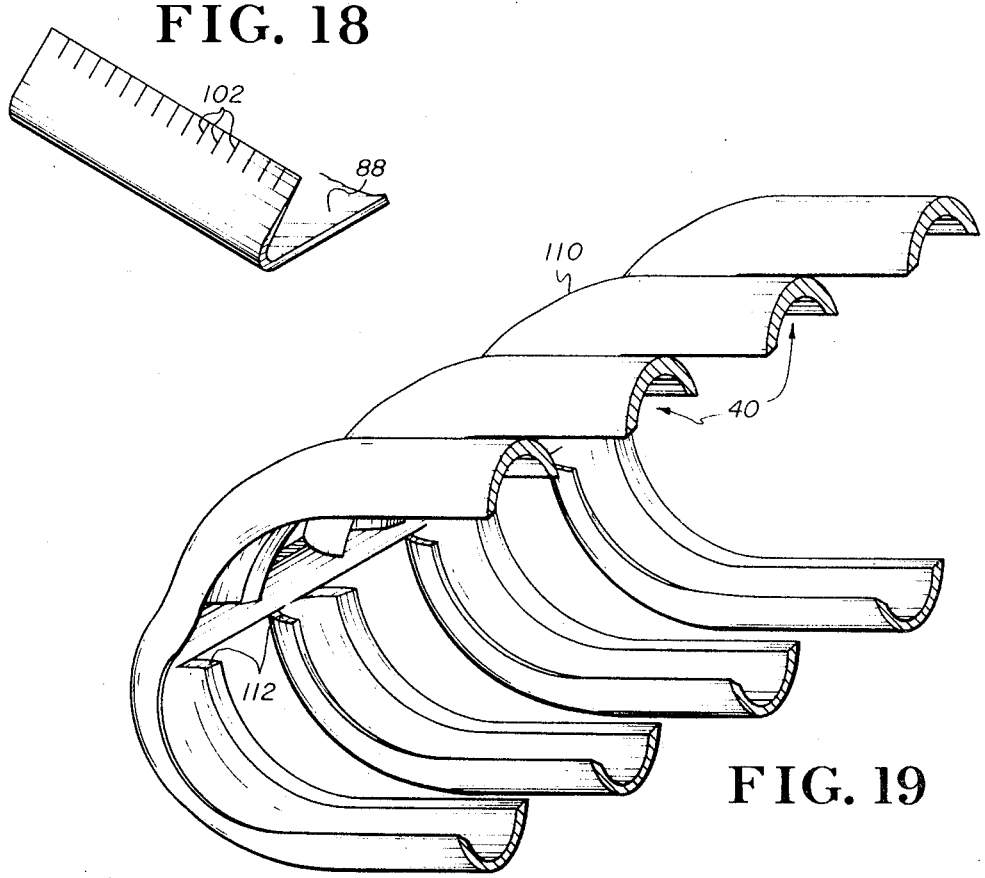
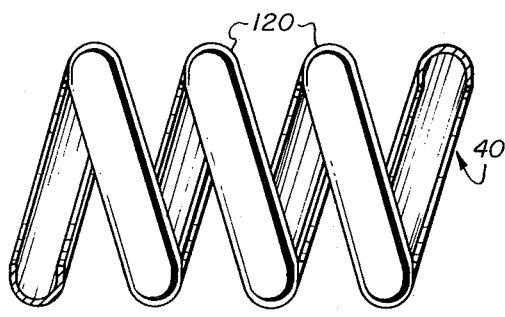
INVENTOR.
TED L. C. KUO
BY
ATTORNEY

3,514,527
INSULATION PIERCING CONNECTOR
Ted L. C. Kuo, Elizabeth, N.J., assignor to Thomas & Betts Corporation, Elizabeth, N.J., a corporation of New Jersey
Filed Dec. 4, 1967, Ser. No. 687,696
Int. Cl. H02g *15/08;* H01r *11/20*
U.S. Cl. 174—84                              40 Claims

ABSTRACT OF THE DISCLOSURE

The invention is directed to an insulation piercing connector which is deformable about an insulated conductor to form a good mechanical and electrical connection. The connector has on one or two opposing members a plurality of arcuate shaped channels having their free ends provided with cutting edges. When the connector is subjected to externally applied forces these arcuate channels force their cutting edges through the insulation into the material of the conductor itself and are then deformed in order to trap a portion of the material of the conductor between adjacent arcuate channels and thus assure a good electrical and mechanical connection. The basic structure of the connector may be provided with additional jackets to insure that the connector will remain engaged with the conductor after the removal of the externally applied force and also to provide insulation, if a self-insulating connector is desired. Additionally, strain relief devices are provided in order to prevent destruction of the conductor once the connector has been assembled thereto.

BACKGROUND OF THE INVENTION

Field of the invention

The invention is directed to the field of electrical connectors and more particularly to electrical connectors useable with insulated conductors. With the vast improvement in insulating materials used on conductors employed, for example, in the windings of motors and similar devices to be subjected to high temperature, due to high duty cycles or bad environmental conditions the connection of connectors to such wire becomes increasingly difficult. In many instances it is necessary to burn away the insulation in order to remove it therefrom. Normal scraping devices are poorly suited to such highly insulated conductors and individual hand scraping of wires to remove the insulation material is extremely time consuming and will often lead to the weakening or destruction of the conductor due to the removal of the portion of the conductor.

Description of the prior art

Known insulation piercing connectors for use with insulated wire, which has not been stripped, make use of a plurality of tongues, or serrated tabs of various types to cut through the insulation of the conductor and contact the conductor metal and thus attempt to make a mechanical and electrical connection thereto. However, the insulation is generally so hard and tough in these situations, that the individual tongues, or tabs, are insufficient to cut through the insulation and make a good mechanical or electrical connection. The relative size of the conductor, and the tongues or tabs employed, often causes the tabs or tongues to be displaced by the insulation and thus make a poor contact with the conductor metal. Further, improper piercing of the insulation and the creepage of the insulation causes displacement of the tongue or tab after the connection has been achieved. Further, the poor contacting or piercing of the insulation and contact with the conductor metal in such prior art insulation piercing connectors provides only minimal contact and thus prevents the connector from carrying full current. In many instances the poor connection will not be noticed until there is an attempt to put a full load through the conductor at which time excess heating and possible destruction of the conductor and connector will be caused. In situations where the insulated conductors are of the vinyl type the tongues and tabs may not reach the conductor at all and may be deflected or absorbed in the yieldable vinyl coat. Further, according to prior art devices the ability of the connector to be crimped to the conductor is dependent upon the plastic defamation of both the conductor and its insulation and the connector itself. A great amount of pressure is required in order to cause deformation of the various members and thus not all of the applied force can be applied to cause the desired connection. Additionally, the application of such connectors as found in the prior art is fatigueing and time consuming as well as failing in most instances to provide an assured connection mechanically and electrically between the connector and the conductor.

SUMMARY OF THE INVENTION

The present invention overcomes the difficulties noted with prior art insulation piercing connectors which use tongues or tabs to pierce the insulation and make contact with the conductor metal of the insulated conductor. This is achieved by use of a unique system of arcuate channels each having, at their free ends, cutting edges. When the connector is crimped about an insulated conductor these arcuate channels are caused to cut through the insulation completely and to enter into the material of the conductor and then to further deform such as to grasp up a portion of the conductor and to trap it between adjacent ones of the arcuate channels. In this manner, a solid mechanical as well as electrical connection is achieved. The insulation is prevented, by its positioning, from going back into the cuts made by the arcuate channels causing displacement of the connector itself. Additionally, any backflow which will exist as the insulation attempts to revert to its former position due to plastic memory merely causes a seal, which is dustproof and waterproof, to exist. Further, any change in the size of the conductor due to thermal expansion or contraction is matched by similar expansion or contraction of the connector assuring a positive connection. The basic unit makes use of a preformed connector having a top and bottom member and one deformable side wall capable of holding the top and bottom members in two stable states. The first being the open state for receipt of an insulated conductor therebetween and the second, any one of a plurality of stable states caused by the deforming of the connector in response to externally applied force to the size of the conductor. Along a first member, either the top or the bottom member, are placed a plurality of arcuate channels having free ends which have cutting edges thereon. The device in other configurations may include two side walls and they also include arcuate channels on both the top and the bottom member. To provide additional support for the connector and to insure that the connection is not easily separated due to vibration forces and other conditions of that type, an outer jacket of metal, also deformable, may be added. Finally the device may be provided with an insulation jacket about the entire connector to provide a self insulating connector. Further, strain relief devices may be added either to the basic connector or to its outer metal jacket to minimize strain applied to the conductor at the points where the connector has pierced into the material of the connector itself.

It is therefore an object of this invention to provide an improved form of insulation piercing connector.

It is yet another object of this invention to provide an improved form of insulation piercing connector which is capable of operating with highly insulated conductors and which can provide positive electrical and mechanical connection thereto.

It is still another object of this invention to provide an improved form of insulation piercing connector having arcuate channels each channel having cutting edges at its free end and permitted to pierce the insulation and enter the material of the conductor and thus to provide positive mechanical and electrical connection thereto.

It is yet another object of this invention to provide an improved form of insulation piercing connector whereby the action of the connector itself is such as to permit the plastic memory of the insulation material to cause a hermetic and dirt free seal about the connection.

It is still another object of this invention to provide an improved insulation piercing connector which is simple to manufacture and easy to employ and may be applied to conductors using simple available tools.

Other objects and features of the invention will be pointed out in the following description and claims and illustrated in the accompanying drawings, which disclose, by way of example, the principal of the invention, and the best mode which has been contemplated for carrying it out.

BRIEF DESCRIPTION OF THE DRAWING

In the drawings:

FIG. 1 is an isometric drawing, partly in section, of a connector constructed in accordance with the concepts of the invention, FIG. 2 is an isometric view, partly in section, of a second embodiment of the connector of FIG. 1 and illustrated in the unassembled condition.

FIG. 3 illustrates one form of the arcuate channels employed with the connector of FIG. 1.

FIG. 4 shows an alternative embodiment of the arcuate channels of FIG. 1.

FIG. 5 is a schematic representation, in section, of the connector of FIG. 1 prior to compression of the connector to the conductor.

FIG. 6 is a schematic diagram, in section, of the connector of FIG. 1 showing the condition of the connector arcuate channels and the conductor shortly after the start of the compression operation.

FIG. 7 is a schematic representation, in section, of the arcuate channels of the connector of FIG. 1 engaged with the conductor during the crimping operation.

FIG. 8 is a schematic representation, in section, of the condition of the arcuate channels of the connector of FIG. 1 after the crimping operation has been completed.

FIG. 9 is a schematic representation of a connector constructed in accordance with the concepts of FIG. 1 fully installed with respect to a plurality of conductors.

FIG. 18 shows a further embodiment of the strain relief tabs of FIG. 11.

FIG. 19 is an isometrice view of a further form of the arcuate channels of FIG. 1.

FIG. 20 is a side elevation of a helical form of the arcuate cutting channels as shown in FIG. 1.

Similar elements are given similar reference numerals in each of the respective figures.

Turning now to FIG. 1 there is illustrated a connector 30 constructed in accordance with the concepts of this invention. Connector 30 has a top member 32, a bottom member 34 and side members 36 and 38. Although the connector of FIG. 1 is shown to have two side members, 36 and 38, the connector 30 may also be fabricated employing only a single side member, such as 36, coupling the top member 32 and the bottom member 34. Further although the device is shown to be fabricated from a single piece of material, as will be described below with respect to FIG. 2, it may also be constructed of three separate members coupled at the respective jointure points. Additionally, the side member 36 is shown in a corrugated form for ease in the crimping operation. Again, any other technique may be employed for weakening to some degree the side wall 36 so that it may be more readily deformed during the crimping operation in order to couple the connector to the conductor. Alternative forms of such weakening may be a series of serrated lines, removal of material or any similar technique. Punched or otherwise formed in the top member 32 are a purality of arcuate channels 40 each having cutting bars such as at 40a and 40b. Each of the free ends of the cutting bars 40a and 40b are provided with knife edges (as in FIG. 1), serrated edges as in FIG. 2) or similar cutting edges. In the forming operation of the cutting bars 40a and 40b the metal is formed in such a way that arcuate channels 40 will result with the top or curved portion of the arch being coupled directly to the top member 32. In a similar manner the cutting bars 40c and 40d form additional arcuate channels 40 visible at the bottom portion of the figure as part of the bottom member 34. It should be understood that although arcuate channels 40 have been shown in both the top member 32 and the bottom member 34 it is not necessary that arcuate channels 40 be provided in both members.

Turning now to FIG. 2 the connector 30 of FIG. 1 is shown in a fully laid out form so that the construction of the arcuate channels 40 may be better appreciated. As can be seen, arcuate channels 40 having cutting bars 40a and 40b are formed from the top member 32 while the arcuate channels 40 having cutting bars 40c and 40d has been formed from the bottom member 34. It should be noted that the arcuate channels 40 of the top member 32 are not aligned with the arcuate channels 40 of bottom member 34. Thus when the connector 30 is assembled cutting bars 40a and 40b will tend to move into the space between the cutting bars 40c and 40e. In this manner there will be less local stress upon a conductor placed within the connector 30. If the cutting bars of the arcuate channels 40 were in line with one another it would be possible, during connection to a small diameter conductor, to cause the arcuate channel 40 cutting bars to go completely through the conductor and thus sever it. The offsetting of the arcuate channels 40 on the top member 32 with respect to the arcuate channels 40 on the bottom member 34 prevent this from occurring and also insure that a better grasp of the conductor will be achieved when assembled, as will be explained below. Again, as was set forth with respect to FIG. 1, the arcuate channels 40 on the bottom member 34, or the top member 32, may be eliminated and only a single row of arcuate channels 40 employed. Further, the side wall 38 may be eliminated to form a three part connector 30 or in an alternative it is possible to both eliminate side wall 38 as well as to eliminate the arcuate channels on either the top member 32 or the bottom member 34. It should be noted that the cutting bars of the connector 30 of FIG. 1 have knife edges while the cutting bars of the connector 30 of FIG. 2 have serrated edges.

Turning now to FIG. 3, a single one of the arcuate channels 40 of FIGS. 1 and 2 is shown. The arcuate channels 40 of FIG. 3 is shown to be generally U-shaped having cutting bars 40a and 40b. The free ends of the cutting bars 40a and 40b each terminate in a knife edge 42. The angle of the knife edge 42 will be determined with reference to the conductor thickness, the type of insulation and the material from which the connector is fabricated. Assuming that a crimping force is to be applied along the axis of the arcuate channel 40 as at 44, the force will be transmitted along the cutting bars 40a and 40b and would appear as forces along the lines 46 and 48 tending to move the cutting bars 40a and 40b out from their central axial position. This outward displacement of cutting bars 40a and 40b, as will be explained below, is the reason for the piercing of the insulation and the material of the conductor and permits the imbeding of the cutting bars of the arcuate channel 40 into the material of the conductor itself.

In FIG. 4, the basic arcuate channel 50 is modified to the shape of an arch. The force transmitted from the impression of a crimping force along the axis as at 52 will also cause the cutting bars to move outwardly in a manner similar to the cutting bars of FIG. 3, along lines 56 and 58. The difference in the forms of the arcuate channels 40 and 50 are most related to the type of conductor and the size of conductors with which the connector is to be employed. Arcuate channels of the shape generally shown as 40 in FIG. 3 tend to cut downwardly to a greater depth before the cutting bars 40a and 40b follow the force lines 46 and 48 and are thus more suited to larger size conductors. Their use with smaller size conductors, due to the excessive downward force, prior to the spreading of the cutting bars 40a and 40b may be responsible for the cutting of a conductor to a point where it is either severed or greatly weakened and thus the arch form of the arcuate channels 50, as shown in FIG. 4 is employed. The force applied as at 52 along the axis will tend to spread the arcuate channel 52 more rapidly and will minimize the downward thrust into the conductor, permitting the grasping of the conductor by the arcuate channels 50 without damage or destruction to the conductor. Although the channels 40 have been shown as arcuate, they may be square or triangle truss shaped. Further, the channels 40 do not have to lie perpendicular to the conductor but may be at any desired angle. Such angular positioning will decrease the number of cutting bars but will increase the area of contact of each cutting bar.

Turning now to FIGS. 5 through 8 a schematic representation of the manner of operation of the connector 30 with respect to a conductor 60, having insulation 62 thereon, is shown. Only two arcuate channels 40 are shown for the top and the bottom members 32 and 34 respectively. Although, not shown, it will be assumed that a crimping tool such as a pair of flat pliers, or the like, is applying external forces to the top member 32 and the bottom member 34 of the connector 30. FIG. 5 shows the position of the respective arcuate channels 40 prior to the start of the crimp operation such that there is clearance space provided between the cutting bars of the arcuate channels 40 and the insulation 62 of the conductor 60. The spacing of the top and bottom members 32 and 34 is established according to the conductor gauge, and different size connectors will be available for different gauge ranges: i.e. conductor sizes 20 to 24, etc.

As is shown in FIG. 6 the arcuate channels 40 have, due to the crimping force, cut through the insulation 62 of the conductor 60 and have entered into the metal of the conductor 60 itself. Further, the continual external application of the crimping force to the members 32 and 34 have caused the respective ends of the arcuate channels 40 to spread toward one another. The further application of compression force will cause the cutting bars 40a and 40b to travel along the paths shown by the arrows 46 and 48 in FIG. 3; that is, these paths will be downwardly and expanding with respect to the axial center of each of the respective arcuate channels 40. As can be seen from FIG. 6, the insulation 62 has started to buckle as at 64, in an effort to seal the apertures placed in the insulation 62 by the entrance of the arcuate channels 40. In FIG. 7 a more complete entrance of the arcuate channels 40 into the conductor 60 is shown. As can be seen the insulation 62 has bunched up to a large degree, as at 64, and the arcuate channels 40 themselves have begun to spread in a drastic manner.

Figure 10:
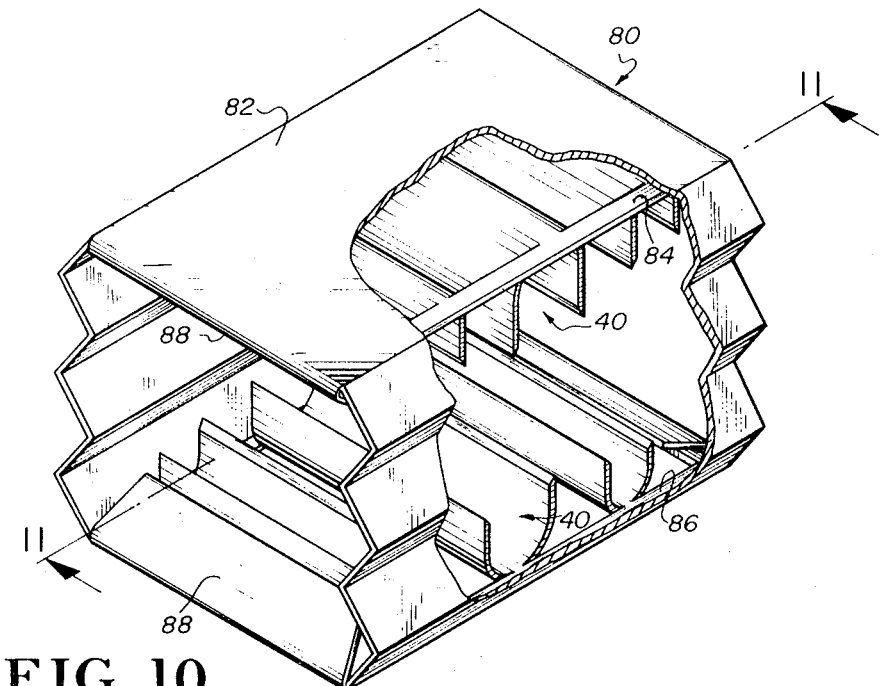
FIG. 10 is an isometric, partly sectioned view of an alternative construction of the connector of FIG. 1.

Now turning to FIG. 8, the crimping operation has been completed and the arcuate channels have now totally entered the conductor 60 metal and the insulation 62 has been permitted to flow back to seal the apertures made in the insulation 62 due to the entrance of the arcuate channels 40 into and through the insulation and into the metal of the conductor 60. The cutting bars 40a and 40b are now spread to their maximum degree. A pinching action exists in the area of the conductor 60 behind the arcuate channels 40, as at 66. That is to say, the continued force applied to the connector 30 in its fully crimped position will cause the cutting bars of each of the arcuate channels 40 to exert forces against areas, such as area 66 of the conductor 60 directly behind these cutting bars and thus causing maximum amount of gripping of the arcuate channels 40 to the metal of the conductor 60 itself. Further, a degree of pinching will occur between the cutting bars of the upper and the lower arcuate channels, that is the channels associated with the top member 32 and the bottom member 34. Further, due to the spreading effect and the manner of imbedding of the arcuate channels 40 within the conductor material resistance is provided to any attemped withdrawal of the arcuate channels 40 from the conductor 60 metal due to such actions as vibration, or due to stresses and tension placed upon the conductor 60 itself.

Turning now to FIG. 9 there is shown in section a completely assembled connector 30 crimped about conductors 70 and 72. A portion of the conductor 70 has been removed, as has a portion of the connector 30 to illustrate the relative positions of the arcuate channels 40 with respect to the conductors. As can be seen, the arcuate channels 40 are completely imbedded within the conductor metal of the conductor 70. The insulation has flowed towards its normal position due to the plastic memory of the insulation providing a seal for the cutting bars against moisture and dirt.

Turning now to FIG. 10 there is shown a further embodiment of a connector constructed in accordance with the concepts of the invention. In this embodiment the connector 80 has been fabricated employing an outside shell 82 having a top member, a bottom member and corrugated side members. This shell 82 is of conductive material and is deformable and capable of remaining in a stable deformed state. Placed within the outer shell 82 is a separate top insert 84 and a bottom insert 86, each constructed in a manner similar to the top member 32 or bottom member 34 of FIG. 1. That is, formed from the material of the members 84 or 86 are a plurality of arcuate channels 40. It should be noted that although the insert members 84 and 86 have been shown fabricated from individual pieces a single member, made up of the inserts 84 and 86 and including the side members, could also be constructed and slipped within the outer shell 82. It should also be noted that strain relief tabs 88 are applied to the entrance and exit portions of the connector 80 on both the top and bottom portions thereof. The manner of operation of these strain relief tabs 88 will be described below with reference to FIG. 11.

Figure 11:
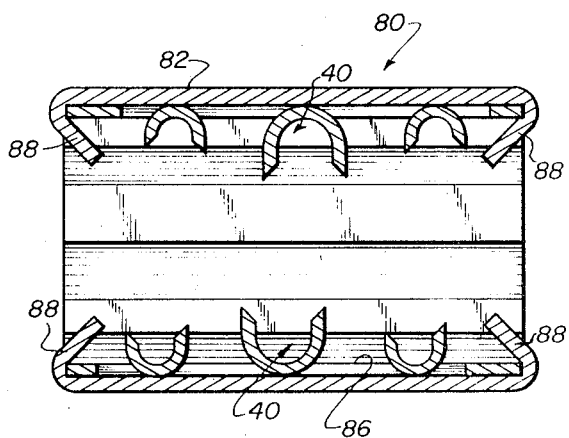
FIG. 11 shows a sectional, side elevation of the device of FIG. 10 taken along the lines 11—11 of FIG. 10.

Turning now to FIG. 11 there is shown a cut away section of FIG. 10 taken along the lines 11—11 of FIG. 10. The internal details indicate a few of the features of the entire connector line. Firstly, it should be noted that the arcuate channel 40, located in the approximate center of the connector 80, has the longest cutting bars of all arcuate channels 40 found within the connector. The arcuate channels 40 having cutting bars 40f and 40g, found alongside of the central arcuate channel 40, are shown to have shorter cutting bars. It should be noted that although only three arcuate channels 40 have been shown in FIG. 11, as many or as few as are desired for any application may be placed therein. The reason for the varying lengths of the cutting bars of the arcuate channels 40, within the connector 80, is explained as follows. A conductor placed into such a connector 80 will tend to have certain stresses applied to it as a result of the movement of the conductors with which the connector is associated. If the depth of cut of the arcuate channels 40 was uniform throughout the length of the connector 80 it would similarly weaken the conductor at each one of the points of entry of the arcuate channels. Stresses applied to the conductor might cause the conductor to be severed destroying the connection. But by decreasing the depth of penetration away from the center, stress relief is provided with only a minimization of contact area. Thus a compromise is struck between the desire for a good electrical and mechanical connection between connector and conductor 80 while retaining to the greatest degree the integrity of the conductor itself.

Figure 12:
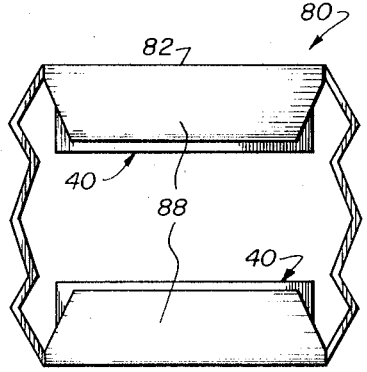
FIG. 12 is an end view of the connector of FIG. 10.

To further minimize the amount of stress exerted upon the conductor by the connector and the possible destruction of the conductor once coupled to the connector strain relief tabs 88 are included at both the entrance and exit to the connector 80. These tabs may have blunt or knife edges or any other convenient type of edge and will not actually cut the insulation of the conductor but will be merely brought into contact with the conductor to firmly grasp it and thus to remove or greatly reduce the stresses which may be placed upon the conductor at the points of entrance of the arcuate channels. FIG. 12 shows a front view of the connector 80 of FIG. 11 and shows the relative locations and heights of the strain relief tabs 88 with respect to the arcuate channels 40. The strain relief tabs 88 will be folded in and upon a conductor placed within the connector 80. As the connector 80 is compressed the strain relief tabs 88 will be pressed into the insulation of the conductor assuring a tight mechanical connection able to withstand stress applied to the conductor without causing rupture of the conductor at the cutting bars.

Figure 13:
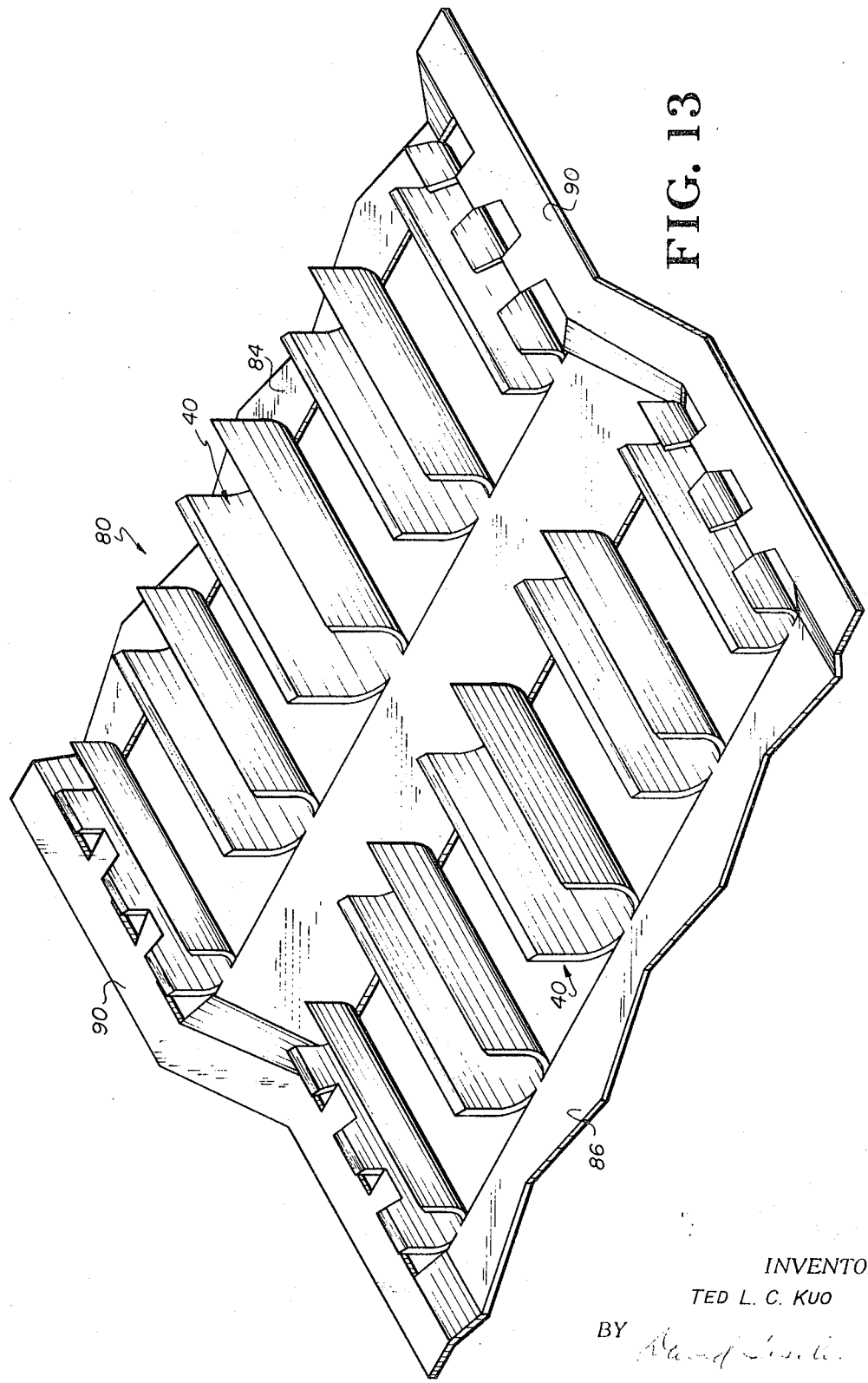
FIG. 13 is a isometric layout of an alternative form of the connector construction of the connector of FIG. 1 illustrating further strain relief tabs thereon.
Figure 14:
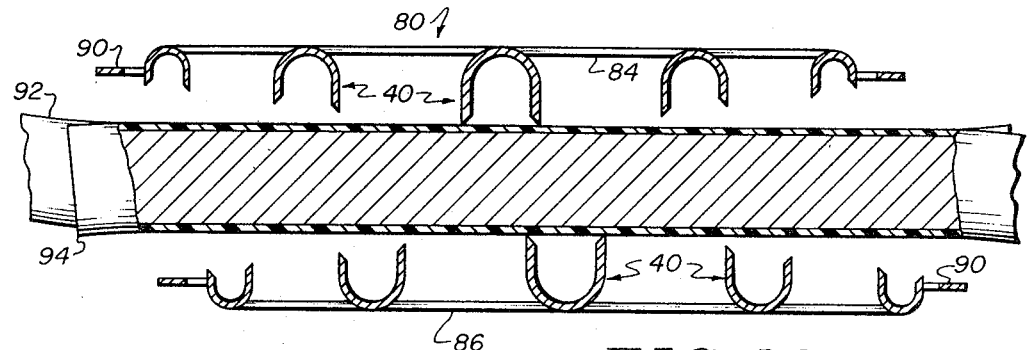
FIG. 14 is a schematic representation, in section, of the connector as shown in FIG. 13 applied to a conductor. The condition of the conductor and connector are prior to the beginning of the compression cycle.
Figure 15:
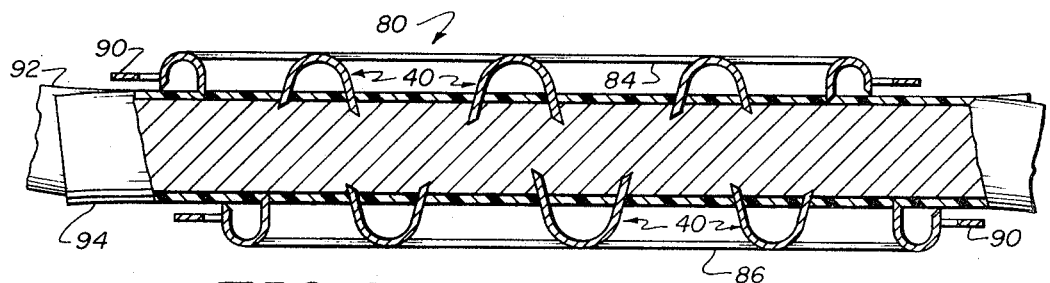
FIG. 15 is a schematic representation, in section, of the partial assembly of the connector of FIG. 13 with a conductor.
Figure 16:
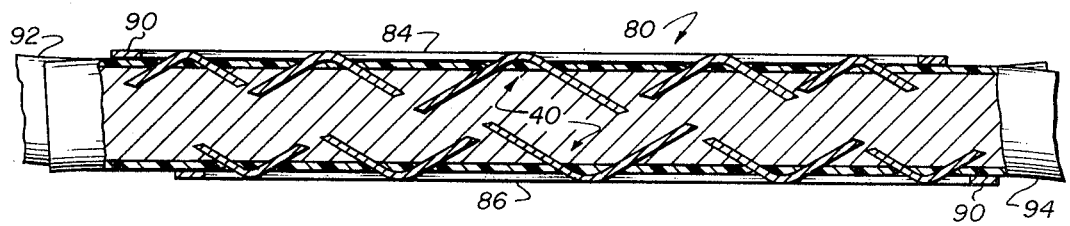
FIG. 16 is a schematic representation, in section, of the connector of FIG. 13 indicating the relative conditions of the conductor arcuate channels and strain relief tabs and the connector element after the connection between the conductor and connector have been completed.

Turning now to FIG. 13 a further embodiment of the connector 30 shown in FIG. 1 is illustrated. The construction is similar to that shown in FIG. 2 except that additional strain relief tabs 90 are shown. Their manner of operation is better understood from a study of FIGS. 14, 15 and 16 next to be explained. The operation of the arcuate channels 40 is the same as that set forth with respect to FIGS. 5 through 8 and will not be described again. As the arcuate channels 40, as shown in FIGS. 14, 15 and 16 made to enter the metal of the conductors 92 and 94 the strain relief tabs 90 coupled to the extreme arcuate channels 40, on both the left and right of the figure, are brought closer and closer to contact with the insulation of the conductors 92 and 94. When the crimping operation is complete, as is shown in FIG. 16, the strain relief tabs 90 will run parallel with and will sit atop the insulation of the conductors 92 and 94 placed within the connector 80. These strain relief tabs 90, fitting between the insulation of the conductors 92 and 94 and between the outer shell 82 when compressed will form a secure contact between the insulated conductors 92 and 94 and the outer shell 82 and thus minimize the effective transmittal of strain to the conductors 92 and 94 once crimped.

Figure 17:
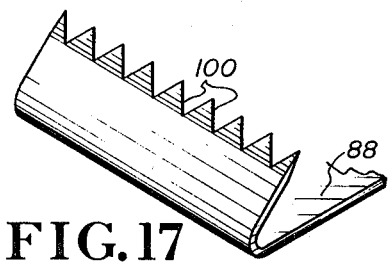
FIG. 17 illustrates an alternative form of the cutting edge of the strain relief tabs of the device of FIG. 11.

Turning now to FIGS. 17 and 18 the shape of the edge of the strain relief tabs 88 of FIGS. 11 and 12 are shown. As is shown in FIG. 17 the edge 100 is serrated and thus will provide a better grip on certain types of material that might otherwise be deformed or resist cutting by straight knife-edged devices as is shown in FIGS. 11 and 12. In FIG. 18 the edge 102 has been slotted along its length to permit it to conform to certain distorted forms of the insulation without necessity for cutting therethrough.

Referring now to FIG. 19 there is shown an insert 110 for use with an outer jacket such as 82 of FIG. 10. The insert 110 is arcuate and provides arcuate channels 40. The insert 110 is weakened as along line 122 to permit distortion during crimping. The manner of operation of the arcuate channels 40 is the same as shown and described with respect to FIG. 1. In FIG. 20 a helical insert 120 is provided. It too has arcuate channels 40 which function in a manner as described with respect to FIG. 1. Inserts 110 and 120 may also be used directly with an insulated jacket, not employing an outer shell such as 82. Each of the embodiments shown and described may also be provided with insulated shells for self insulating connectors.

The embodiments of the invention in which an exclusive property or privilege is claimed are defined as follows:

1. An insulation piercing connector comprising: a top member and a bottom member being laterally spaced sufficiently to receive an insulated conductor therebetween; at least one side member coupled to said top member and said bottom member, said side member in a first stable state maintaining said top and bottom members in said conductor receiving spaced relationship and being deformable to discrete second stable states for varying the spaced relationship of said top and bottom members; at least one of said top and bottom members having a plurality of piercing members extending therefrom and directed towards the opposite members; each of said piercing members having a cutting edge at a free end thereof; each of said piercing members are generally arcuate channels formed integrally with said top or bottom members; said side member adapted to be deformed in response to an externally applied force whereby said piercing members are caused to pierce the insulation and conductor material of an insulated conductor placed between said top and bottom members and to remain in such state upon the removal of such externally applied force.

2. An insulation piercing connector, as defined in claim 1, wherein each leg of said arcuate channels has a knife edge.

3. An insulation piercing connector, as defined in claim 1, wherein each leg of said arcuate channel has a serrated edge.

4. An insulation piercing connector, as defined in claim 1, wherein both said top and bottom members have a plurality of piercing members extending therefrom, the piercing members on said top and bottom members being directed towards one another.

5. An insulation piercing connector, as defined in claim 4, wherein each leg of said arcuate channel has a knife edge.

6. An insulation piercing connector, as defined in claim 4, wherein each leg of said arcuate channel has a serrated edge.

7. An insulation piercing connector, as defined in claim 4, wherein there are two sidewalls coupled to said top and bottom members.

8. An insulation piercing connector, as defined in claim 7, further comprising strain relief means engageable with said insulated conductor when said connector is subjected to the externally applied force.

9. An insulation piercing connector, as defined in claim 8, wherein said strain relief means comprises additional contact members coupled to selected ones of said piercing members at the entrance and exit to said connector whereby said contact members grip the insulation of said insulated connector when said connector is subjected to externally applied force.

10. An insulation piercing connector, as defined in claim 7, further comprising an outer jacket about said connector to prevent expansion of said connector after the externally applied force has been removed.

11. An insulation piercing connector, as defined in claim 10, wherein said outer jacket includes contact members adjacent the entrance and exit to said connector whereby said contact members grip the insulation of said insulated conductor when said connector is subjected to externally applied force.

12. An insulation piercing connector, as defined in claim 10, further including an insulated jacket over said outer jacket.

13. An insulation piercing connector, as defined in claim 4, further comprising strain relief means engageable with said insulated conductor when said connector is subjected to the externally applied force.

14. An insulation piercing connector, as defined in claim 3, wherein said strain relief means comprises additional contact members coupled to selected one of said piercing members at the entrance and exit to said connector whereby said contact members grip the insulation of said insulated connector when said connector is subjected to externally applied force.

15. An insulation piercing connector, as defined in claim 4, further comprising an outer jacket about said connector to prevent expansion of said connector after the externally applied force has been removed.

16. An insulation piercing connector, as defined in claim 15, wherein said outer jacket includes contact members adjacent the entrance and exit to said connector whereby said contact members grip the insulation of said insulated conductor when said connector is subjected to externally applied force.

17. An insulation piercing connector, as defined in claim 15, further including an insulated jacket over said outer jacket.

18. An insulation piercing connector, as defined in claim 1, wherein there are two sidewalls coupled to said top and bottom members.

19. An insulation piercing connector, as defined in claim 18, wherein each leg of said arcuate channels has a knife edge.

20. An insulation piercing connector, as defined in claim 18, wherein each leg of said arcuate channels has a serrated edge.

21. An insulation piercing connector, as defined in claim 18, further comprising strain relief means engageable with said insulated conductor when said connector is subjected to the externally applied force.

22. An insulation piercing connector, as defined in claim 21, wherein said strain relief means comprises additional contact members coupled to selected ones of said piercing members at the entrance and exit to said connector whereby said contact members grip the insulation of said insulated connector when said connector is subject to externally applied force.

23. An insulation piercing connector, as defined in claim 18, further comprising an outer jacket about said connector to prevent expansion of said connector after the externally applied force has been removed.

24. An insulation piercing connector, as defined in claim 23, wherein said outer jacket includes contact members adjacent the entrance and exit to said connector whereby said contact members grip the insulation of said insulated conductor when said connector is subjected to externally applied force.

25. An insulation piercing connector, as defined in claim 23, further including an insulated jacket over said outer jacket.

26. An insulation piercing connector, as defined in claim 1, further comprising strain relief means engageable with said insulated conductor when said connector is subject to the externally applied force.

27. An insulation piercing connector, as defined in claim 26, wherein said strain relief means comprises additional contact members coupled to selected ones of said piercing members at the entarnce and exit to said connector whereby said contact members grip the insulation of said insulated connector when said connector is subjected to externally applied force.

28. An insulation piercing connector, as defined in claim 1, further comprising an outer jacket about said connector to prevent expansion of said connector after the externally applied force has been removed.

29. An insulation piercing connector, as defined in claim 28, wherein said outer jacket includes contact members adjacent the entrance and exit to said connector whereby said contact members grip the insulation of said insulated conductor when said connector is subjected to externally applied force.

30. An insulation piercing connector, as defined in claim 28, further including an insulated jacket over said outer jacket.

31. An insulation piercing connector comprising: a top member and a bottom member being laterally spaced sufficiently to receive an insulated conductor therebetween; at least one side member coupled to said top member and said bottom member, said side member in a first stable state maintaining said top and bottom members in said conductor receiving spaced relationship and being deformable to descrete second stable states for varying the spaced relationship of said top and bottom members; both said top and bottom members having a plurality of piercing members extending therefrom, the piercing members or said top and bottom members being directed towards one another; said piercing members formed as an arcuate channel in the shape of a helix; said piercing members having a cutting edge at a free end thereof; said side member adapted to be deformed in response to an externally applied force whereby said piercing members are caused to pierce the insulation and conductor material of an insulated conductor placed between said top and bottom members and to remain in such state upon the removal of such externally applied force.

32. An insulation piercing connector, as defined in claim 31, wherein the inwardly extending edges of said helically shaped channels have knife edges.

33. An insulation piercing connector, as defined in claim 31, wherein the inwardly extending edges of said helically shaped channels are serrated.

34. An insulation piercing connector comprising: a top member and a bottom member being laterally spaced sufficiently to receive an insulated conductor therebetween; two side members coupled to said top member and said bottom member at opposite edges thereof, said side members in a first stable state maintaining said top and bottom members in said conductor receiving spaced relationship and being deformable to discrete second stable states for varying the spaced relationship of said top and bottom members; at least one of said top and bottom members having a plurality of piercing members extending therefrom and directed towards the opposite member; said piercing members comprise an arcuate channel in the shape of a helix; each of said piercing members having a cutting edge thereon; said side members adapted to be deformed in response to an externally applied force whereby said piercing members are caused to pierce the insulation and conductor material of an insulated conductor placed between said top and bottom members and to remain in such state upon the removal of such externally applied force.

35. An insulation piercing connector, as defined in claim 34, wherein the inwardly extending edges of said helically shaped channel are knife edged.

36. An insulation piercing connector, as defined in claim 35, wherein the inwardly extending edges of said helically shaped channel are serrated.

37. An insulation piercing connector comprising: a top member and a bottom member being laterally spaced sufficiently to receive an insulated conductor therebetween; at least one side member coupled to said top member and said bottom member, said side member in a first stable state maintaining said top and bottom members in said conductor receiving spaced relationship and being deformable to discrete second stable states for varying the spaced relationship of said top and bottom members; at least one of said top and bottom members having a plurality of piercing members extending therefrom and directed towards the opposite member; each of said piercing members having a cutting edge at a free end thereof; the free ends of said piercing members are of varying lengths, being shortest at the entrance and exit to said connector and longest at the center of said connector length; said side member adapted to be deformed in response to an externally applied force whereby said piercing members are caused to pierce the insulation and conductor material of an insulated conductor placed between said top and bottom members and to remain in such state upon the removal of such externally applied force.

38. An insulation piercing connector comprising: a top member and a bottom member being laterally spaced sufficiently to receive an insulated conductor therebetween; at least one side member coupled to said top member and said bottom member, said side member in a first stable state maintaining said top and bottom members in said conductor receiving spaced relationship and being deformable to discrete second stable states for varying the spaced relationship of said top and bottom members; both said top and bottom members having a plurality of piercing members extending therefrom, the piercing members on said top and bottom members being directed towards one another; each of said piercing members having a cutting edge at a free end thereof; the free ends of said piercing members are of varying lengths, being shortest at the entrance and exit to said connector and longest at the center of said connector length; said side member adapted to be deformed in response to an externally applied force whereby said piercing members are caused to pierce the insulation and conductor material of an insulated conductor placed between said top and bottom members and to remain in such state upon the removal of such externally applied force.

39. An insulation piercing connector comprising: a top member and a bottom member being laterally spaced sufficiently to receive an insulated conductor therebetween; two side members coupled to said top member and said bottom member at opposite edges thereof; said side members in a first stable state maintaining said top and bottom members in said conductor receiving spaced relationship and being deformable to discrete second stable states for varying the spaced relationship of said top and bottom members; at least one of said top and bottom members having a plurality of piercing members extending therefrom and directed towards the opposite member; each of said piercing members having a cutting edge at a free end thereof; the free ends of said piercing members are of varying lengths, being shortest at the entrance and exit to said connector and longest at the center of said connector length; said side members adapted to be deformed in response to an externally applied force whereby said piercing members are caused to pierce the insulation and conductor material of an insulated conductor placed between said top and bottom members and to remain in such state upon the removal of such externally applied force.

40. An insulation piercing connector comprising: a top member and a bottom member being laterally spaced sufficiently to receive an insulated conductor therebetween; two side members coupled to said top member and said bottom member at opposite edges thereof, said side members in a first stable state maintaining said top and bottom members in said conductor receiving spaced relationship and being deformable to discrete second stable states for varying the spaced relationship of said top and bottom members; both said top and bottom members have a plurality of piercing members extending therefrom, the piercing members on said top and bottom members being directed towards one another; each of said piercing members having a cutting edge at a free end thereof; the free ends of said piercing members are of varying lengths, being shortest at the entrance and exit to said connector and longest at the center of said connector length; said side members adapted to be deformed in response to an externally applied force whereby said piercing members are caused to pierce the insulation and conductor material of an insulated conductor placed between said top and bottom members and to remain in such state upon the removal of such externally applied force.

References Cited

UNITED STATES PATENTS 3,265,807   8/1966   Smith _____ 174—87

DARRELL L. CLAY, Primary Examiner

U.S. Cl. X.R.

29—628; 174—90; 339—97

UNITED STATES PATENT OFFICE
CERTIFICATE OF CORRECTION

Patent No. 3,514,527　　　　　　　　　　　　May 26, 1970

Ted L. C. Kuo

It is certified that error appears in the above identified patent and that said Letters Patent are hereby corrected as shown below:

Column 9, line 21, delete "3" and insert -- 13 --.
Column 10, line 28, delete "descrete" and insert -- discrete --.

Signed and sealed this 15th day of September 1970.

(SEAL)
Attest:

Edward M. Fletcher, Jr.　　　　　　　　WILLIAM E. SCHUYLER, JR.
Attesting Officer　　　　　　　　　　　　Commissioner of Patents